(No Model.)
L. TURNER.
GAME OF LAWN POOL.
No. 269,351.  Patented Dec. 19, 1882.
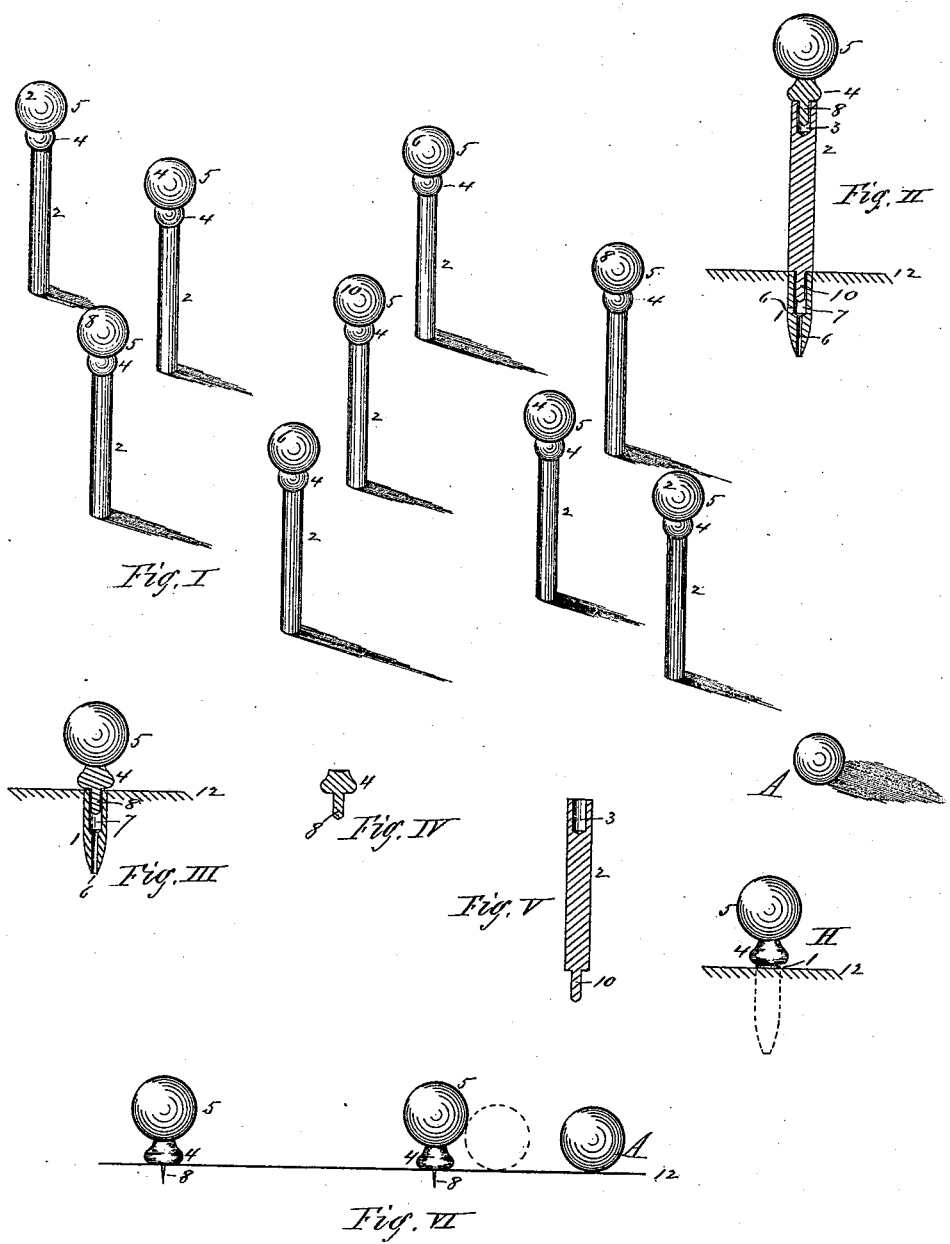

UNITED STATES PATENT OFFICE.

LUCIUS TURNER, OF READING, MASSACHUSETTS.

GAME OF LAWN-POOL.

SPECIFICATION forming part of Letters Patent No. 269,351, dated December 19, 1882.

Application filed August 2, 1882. (No model.)

*To all whom it may concern:*

Be it known that I, LUCIUS TURNER, of Reading, in the county of Middlesex and State of Massachusetts, have invented a new and Improved Game of Lawn-Pool, of which the following is a specification and description.

The object of my invention is to provide a game to be played upon a lawn with balls placed on a support and a striking-instrument, as a mallet; and I construct the implements used in the game substantially as hereinafter described, and illustrated in the accompanying drawings, in which—

Figure I is a perspective view of the stakes and balls as arranged on a lawn for playing. Fig. II is a vertical section of the socket, stake, and cup, and with a ball in place in the cup. Fig. III is a vertical section of the socket and cup, with a ball in place in the cup. Fig. IV is a vertical section of the cup. Fig. V is a vertical section of the stake, and Fig. VI represents a modification illustrating the cups as adapted to be placed in position on a parlor-floor.

In the drawings, 1 represents a socket, made preferably of wood, having a cavity, as 7, made in its upper end, and which may have an outlet at the lower end to let out water which might otherwise collect therein; and 2 represents a stake, whose lower end, as 10, may be in the form of a tenon, and loosely fitted into the cavity 7 of the socket, and whose upper end is provided with a cavity, as 3, into which is loosely fitted the lower end, 8, of a cup, 4, whose upper end is concave or provided with a recess, and of such size that a ball, as 5, carefully placed in said cup or in the recessed part at the upper end will there remain; but a slight blow against the stake or the cup, or against the ball itself, will cause the ball to fall out.

Suppose the line 12 to represent the top of the ground. The sockets are driven into the ground so that the top of the socket 1 is on substantially the same horizontal plane as the top of the ground, and if the game is to be played with stakes the lower end, 10, of each stake is placed in the cavity 7 of the socket, the latter all being collectively arranged in the ground in any desired way, preferably as shown in Fig. I. The cups 4 are then placed in the cavities 3 in the tops of the stakes 2, and a ball, as 5, is placed in each cup, according to any predetermined system of arrangement, but preferably as shown in Fig. I, the first ball at each end being numbered 2, the next 4, the next to the left 6, the next to the left 8, and the middle one 10.

The game may be played by any desired number of players on each side—say two—with the players' balls (ordinary croquet-balls) on one side painted of one color, and those of the other side painted of another color; and the first striker places his ball at a peg, A, or at a certain distance from the first stake, and strikes his own ball with a mallet against the first stake, which knocks or jars the ball in its cup—which is marked 2—to the ground. This counts two on his score, and he proceeds to strike his own ball against the stakes as the balls are numbered in succession, as long as he can hit the stakes and knock off the balls therefrom in succession, counting upon or adding to his score the number marked on each ball successively knocked off. When he misses or fails to knock a ball to the ground from the stake aimed or played for, he ceases to play, and one of the players on the other side plays in his turn, and plays as long as he hits the stakes with his own ball and knocks the balls therefrom; but when he misses or fails to knock a ball from the stake, the next player on the other side plays, and so on, the balls being replaced as fast as they are knocked off, and the side which makes the circuit of the stakes from the starting-point and return is the winner, and of course will make the highest score.

When played as above described, children may play the game, and in keeping each his own score will learn to calculate, or to practice mental arithmetic, in the addition of each successive strike to the preceding ones, and, if desirable, it may be predetermined that for each miss the player making it shall lose any certain number from his score, or any certain number in proportion to the ball aimed at, and in that way will learn subtraction also, so that the game will be a practical aid in teaching children the simple methods of mental arithmetic.

It is of course evident that the game may be used or played in a variety of ways. For example, instead of using the stakes, the cups may be placed in the cavities of the sockets, as shown at H, so that the balls when placed in the cups will be just above the top of the ground, instead of above the stakes, and may be placed in the same relative position as is shown in Fig. I, and the game may then be to see who shall make the highest score in ten (or any desired number of) strikes. The first player then strikes his own ball from the starting-point at A, striking his own ball with a mallet into any position he desires, or against any ball in the system or circuit, without any reference to the balls as numbered in succession. Of course in this arrangement he may play his own ball into a good position to strike a ball at the next play or any after play, or he may play his own ball against any opponent's ball, to prevent that opponent from scoring at his next play. In short, he may strike his own ball into any position and in any direction he chooses, only he is limited to a certain number of strikes—say ten. The one or the side who scores the highest number, as indicated by the sum of the numbers on the balls knocked from the cups in each ten strikes, wins the game.

It is of course obvious from the above as examples that a variety of interesting games may be played on a lawn in this manner and with this apparatus, according as it may be predetermined and agreed for the time by the players participating in the game, and by any desired number of players. In many of the games disputes often arise as to whether a score has been made—as, for example, in croquet, it is often a matter of dispute as to whether or not a ball is through a wicket or arch, and it seems almost impossible to decide; but in this game there can be no dispute, as no score is made unless the ball is knocked from its cup to the ground, and this each player can readily see. The sockets having an opening through the lower end to the ground can be used to receive the wire wickets or arches used in the game of croquet, and as the water which would otherwise collect in them is free to escape they will last much longer than the ordinary sockets, and cost little or no more.

I have described only one or two of the games which may be played upon a lawn with these implements; but the kinds of games which may be played therewith may be varied according to the fancy of the players, and each game as to its peculiarities may be decided upon by the players upon the ground at the time of playing.

It is evident that instead of the concave recess to form the cup at the top a vertical hole may be made in the top of such size that when a ball is placed thereon carefully it will remain in that position, but a slight blow against the stake or against the cup or the ball will jar or knock the latter off, or cause it to fall upon the ground.

The cups shown in Fig. VI are adapted to be set up on a floor, each cup being provided with a wire or slender projection at the lower end, and holes or vertical cavities may be made in the floor at the proper points, and the wires or projections on the lower ends of the cups are set into these holes or cavities, by which the cups are held substantially in a vertical position, so that the balls, when placed in position on the upper ends of the cups, may be easily displaced therefrom by contact of a rolling ball, either with the cup or with the ball placed thereon. As thus arranged the games may be played in a parlor in rainy weather, or when the lawn is unfit for use.

Having thus described my invention, what I claim as new is—

1. The combination, for a lawn game, of a series of sockets each provided with a cavity in the top, a series of stakes each having its lower end adapted to be loosely inserted into said cavity in each socket, and with a cavity in its upper end, a series of cups each adapted to be inserted in the cavity in each stake and recessed at the top, and a series of balls, substantially as described.

2. The combination of a series of sockets each provided with a cavity in the top, a series of cups each having a recess in the top and adapted to be inserted into the cavity in said socket, and a series of balls, substantially as described.

LUCIUS TURNER.

Witnesses:
JOHN WADSWORTH,
CHAS. F. HOWLAND.